US012572272B2

(12) United States Patent
McDermid

(10) Patent No.: US 12,572,272 B2
(45) Date of Patent: Mar. 10, 2026

(54) METHOD FOR COMPUTER KEY AND POINTER INPUT USING GESTURES

(71) Applicant: William James McDermid, Niwot, CO (US)

(72) Inventor: William James McDermid, Niwot, CO (US)

( * ) Notice: Subject to any disclaimer, the term of this patent is extended or adjusted under 35 U.S.C. 154(b) by 539 days.

(21) Appl. No.: 18/092,404

(22) Filed: Jan. 2, 2023

(65) Prior Publication Data

US 2023/0273724 A1      Aug. 31, 2023

Related U.S. Application Data

(60) Provisional application No. 63/296,123, filed on Jan. 3, 2022.

(51) Int. Cl.
| | |
|---|---|
| *G06F 3/0482* | (2013.01) |
| *G06F 3/01* | (2006.01) |
| *G06F 3/04817* | (2022.01) |
| *G06F 3/04842* | (2022.01) |
| *G06F 3/0489* | (2022.01) |

(52) U.S. Cl.
CPC ............ *G06F 3/0489* (2013.01); *G06F 3/017* (2013.01); *G06F 3/04817* (2013.01); *G06F 3/0482* (2013.01); *G06F 3/04842* (2013.01)

(58) Field of Classification Search
CPC .... G06F 3/0489; G06F 3/017; G06F 3/04817; G06F 3/0482; G06F 3/04842
See application file for complete search history.

(56) References Cited

U.S. PATENT DOCUMENTS

| | | | | |
|---|---|---|---|---|
| 2020/0356249 A1* | 11/2020 | Hunter | .................. | G06V 40/20 |
| 2021/0294482 A1* | 9/2021 | Ikeda | .................... | G06V 40/28 |
| 2022/0253148 A1* | 8/2022 | Sorgi | ..................... | G06F 3/017 |

OTHER PUBLICATIONS

Peter B. Shull et al., Hand Gesture Recognition and Finger Angle Estimation via Wrist-Worn Modified Barometric Pressure Sensing, Apr. 1, 2019, IEEE Transactions on Neural Systems and Rehabilitation Engineering, vol. 27, No. 4, pp. 724-731 (Year: 2019).*
Wentao Dong et al., Soft Wrist-Worn Multi-Functional Sensor Array for Real-Time Hand Gesture Recognition, Jan. 9, 2021, IEEE Sensors Journal, vol. 22, No. 18, pp. 17505-17514 (Year: 2021).*

* cited by examiner

*Primary Examiner* — Tam T Tran

(57) ABSTRACT

A method and an apparatus are provided for user input to a computer. A sensing apparatus tracks the position of the wrist and the position of the digits on the hand. A paired display shows left and right arrays of icons representing available inputs and highlights the inputs currently accessible by the digits based on the position of the wrists.

32 Claims, 6 Drawing Sheets

217

112

217

112

217

112

411 —⎯                ⎯— 412
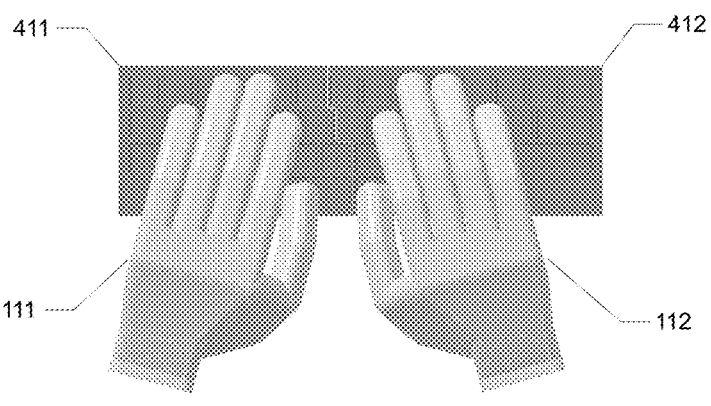
111 —⎯                —⎯ 112
FIG. 4A
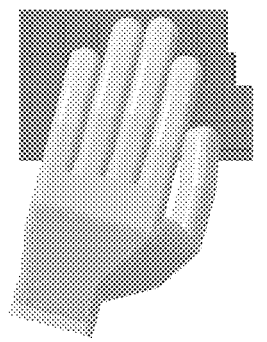                    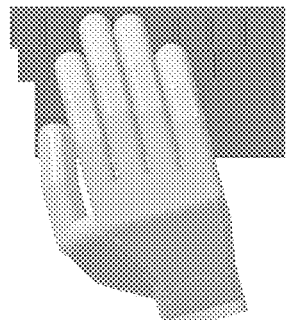
FIG. 4B
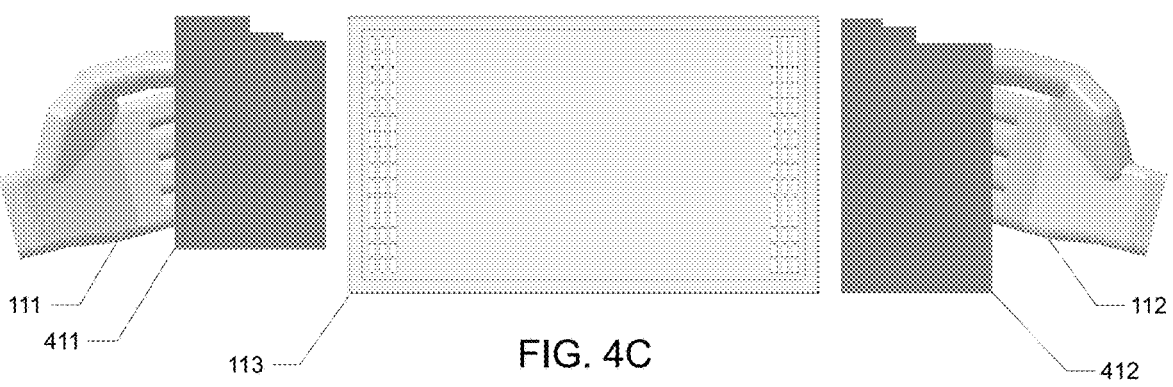
111 —⎯                    —⎯ 112
411 —⎯          113 —⎯    FIG. 4C         —⎯ 412

METHOD FOR COMPUTER KEY AND POINTER INPUT USING GESTURES

CROSS REFERENCE TO RELATED APPLICATIONS

This non-provisional application claims priority to U.S. provisional application 63/296,123 filed on Jan. 3, 2022, which is incorporated herein by reference.

This non-provisional application is related to U.S. Pat. No. 8,810,536 filed by the same inventor on Nov. 2, 2011, and U.S. Pat. No. 11,281,309 filed by the same inventor on Dec. 31, 2020, which are incorporated herein by reference.

This non-provisional application is also related to U.S. patent application Ser. No. 14/526,369 filed by the same inventor on Jun. 7, 2016, and U.S. patent application Ser. No. 18/678,261 filed by the same inventor on Dec. 9, 2021, which are incorporated herein by reference.

BACKGROUND OF THE INVENTION

1. Field of the Invention

This invention relates to a method for human input to and control of a computer.

2. Statement of the Problem

A common user interface for input to a computer employs a keyboard and a pointing device such as a mouse, trackpad, or touchscreen. These devices require a horizontal surface to be used effectively limiting their utility in mobile applications.

A hand-held key-paddle input device, like those disclosed in the patents referenced above, consists of two paddles, one for each hand, connected to each end of a tie bar via pivots. 10 key-switches, one under each finger and each thumb, take on key definitions based on the rotational position of the paddles around the pivots. This allows all the keys of a keyboard to be entered via just 10 physical keys. Paddle rotations also function as a pointing device. Though suitable for many mobile applications, these devices encumber the hands while held.

SUMMARY OF THE SOLUTION

The present invention solves the above and other problems with a virtual key-paddle input device.

Key-paddle devices, with their kinesthetic and tactile feedback, help users learn to associate specific hand and finger movements, or gestures, with corelated computer inputs. With repeated use, these gestures become familiar within the user's motor cortex. With time, the proprioceptive sense is sufficient for controlling the user's execution of the gestures, thereby lessening the dependence on the kinesthetic and tactile feedback from a held device.

The gestures used with a virtual key-paddle device can generate the corelated computer input using alternative sensing apparatuses, such as body worn cameras, gloves with strain and pressure sensors, or wrist bands detecting neural activity, to track the movements of hands and digits and present inputs to a paired computer.

ASPECTS

An aspect of the invention is how a sensing apparatus tracks the positions of a user's hands relative to each other to determine each wrists adduction/abduction position, flexion/extension position, and pronation/supination position, and the flexion and extension of digits and report inputs to a paired computer responsive to said positions.

Alternatively, the sensing apparatus can track the state of a user's wrists by the position of hands relative to their respective arms and the position of the digits relative to their respective hands and report inputs to a paired computer responsive to said positions.

Another aspect of the invention is how the sensing apparatus discriminates between three easily differentiated positions to each of the abduction/adduction, flexion/extension, and pronation/supination wrist movements. A first position is where the hands are at rest, second and third positions are when the wrists move to rotate clockwise and counterclockwise off the first position, respectively.

Another aspect of the invention is how abduction of one or both wrists move the computer focus up and adduction of one or both wrists move the computer focus down.

Another aspect of the invention is how flexion of the right wrist and/or extension of the left wrist moves the computer focus left and flexion of the left wrist and/or extension of the right wrist moves the computer focus right.

Another aspect of the invention is how pronation of one or both wrists move the computer focus in and supination of one or both wrists move the computer focus out.

Another aspect of the invention is how flexion of a digit initiates an event.

Another aspect of the invention is how the sensing apparatus and paired computer operate in a virtual key-input mode or a virtual pointer-input mode.

Preferably, when operating in virtual key-input mode, two hands, three abduction/adduction positions, three extension/flexion positions, three pronation/supination positions, and five digits allow for $2*3*3*3*5=270$ distinct activation events.

Preferably, when operating in virtual pointer-input mode, wrist positions are used to control the pointer and 10 activation events are possible, one for each digit.

Another aspect of the invention is how a map on a display of a paired computer shows the icons for the possible activation events and highlights those currently selectable by flexion of a digit. This interactive icon map is instrumental in training a user on the sequence of movements necessary to select a certain icon.

Preferably, the icon map is divided in half and located along the left and right periphery of the display showing selections for the left and right hands, respectively. By putting the map on the sides and out of the way, the map can be largely ignored but is available for reference should the user need it.

Another aspect of the inventions is using wrist mounted cameras and strain sensors for the sensing apparatus.

Preferably, the cameras are mounted on the inside of the wrists and point toward their respective hands.

Preferably, the wrist bands of the cameras have strain sensors to measure changes in the wrist to track pronation and supination movements.

DESCRIPTION OF THE DRAWINGS

The above and other advantages and features of the invention may be better understood from a reading of the detailed description taken in conjunction with the drawings. The same reference number represents the same element on all drawings.

FIG. 4A through FIG. 4C show how the keys from a standard keyboard are mapped to the icons on the display.

DETAILED DESCRIPTION OF THE INVENTION

FIGS. 1-6 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1A:
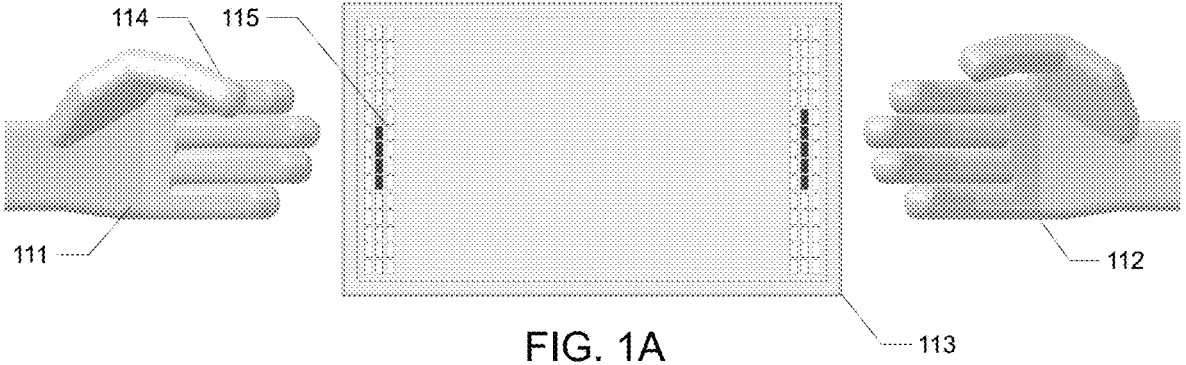
FIG. 1A through 1B show a front view of a user's hands in various abduction/adduction positions and a paired display operating in key-input mode showing the icons highlighted based on the hand positions.

FIG. 1A shows a front view of a user's left hand 111 and right hand 112 in the resting home position and a paired display 113 operating in key-input mode. There are 45 icons on the left side of the display selected by the left hand, and 45 icons on the right side of the display selected by the right hand. The 90 icons are broken into banks of 5 icons to correlate the icons with the user's digits. The top icon in a bank is for the thumb. The two shaded banks of five icons are based on wrist position and signify those icons currently available for activation by flexion of the user's digits. Icon 115 is currently being activated by the flexion of left thumb 114.

Figure 1B:
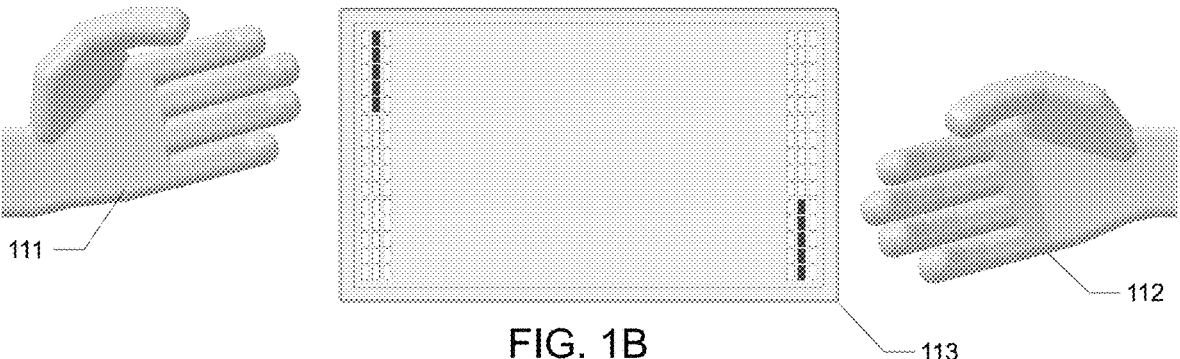

FIG. 1B shows a front view of a user's left hand 111 in an abduction position and right hand 112 in an adduction position causing the highlighted icons on display 113 to move one row up on the left and one row down on the right.

Figure 2A:
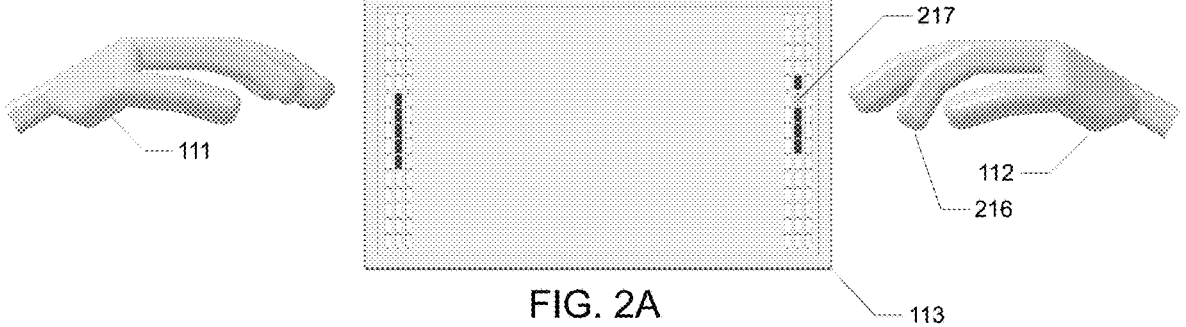
FIG. 2A through FIG. 2B show a top view of a user's hands in various flexion/extension positions and a paired display operating in key-input mode with the icons highlighted based on the hand positions.

FIG. 2A shows a top view of a user's left hand 111 and right hand 112 in the resting home position and a paired display 113 operating in key-input mode. The two shaded banks of five icons are based on wrist position and signify those icons currently available for activation by flexion of the user's digits. Icon 215 is currently being activated by the flexion of index finger 214.

Figure 2B:
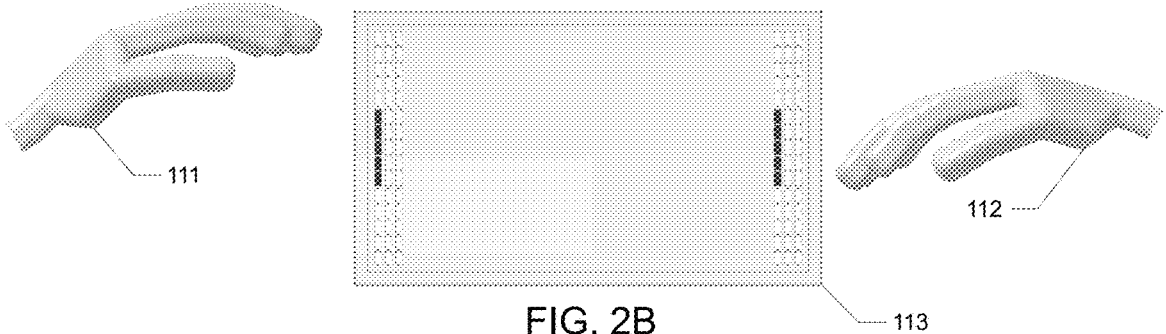

FIG. 2B shows a top view of a user's left hand 111 in an extension position and right hand 112 in a flexion position causing the highlighted icons on display 113 to move one column towards the edge of the display on the left and one column toward the center of the display on the right.

Figure 3A:
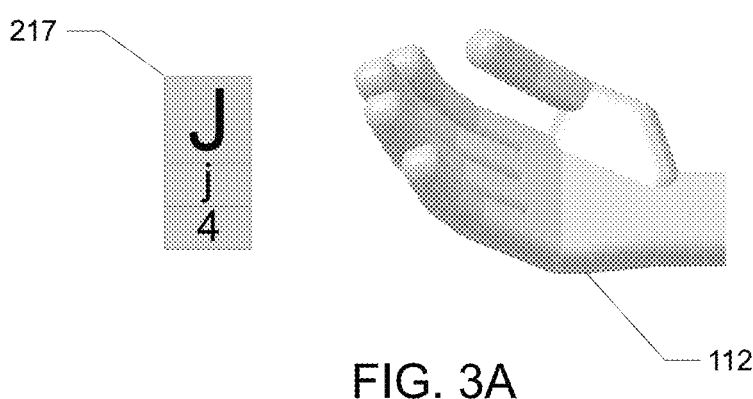
FIG. 3A through FIG. 3C show a front view of a user's hand in various pronation/supination positions and an icon from paired display operating in key-input mode with the highlighted key definition based on the hand position.

FIG. 3A shows a front view of a user's right hand 112 in a supination position selecting the top definition for icon 217.

Figure 3B:
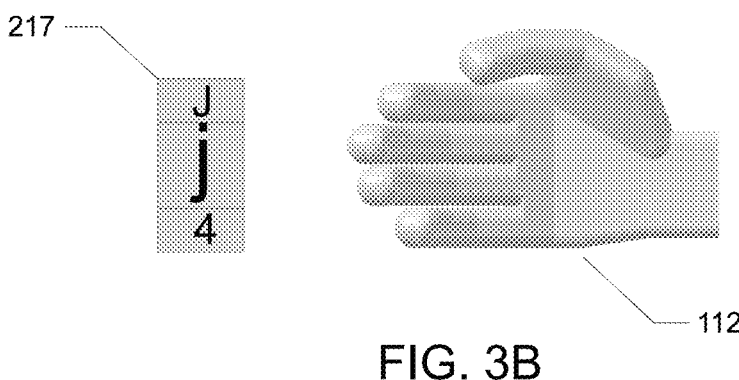

FIG. 3B shows a front view of a user's right hand 112 in a neutral position selecting the center definition for icon 217.

Figure 3C:
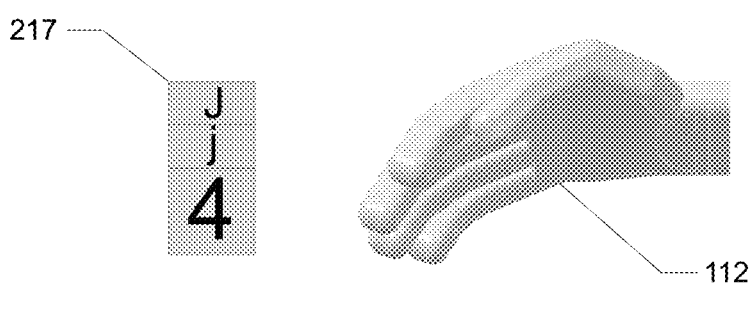

FIG. 3C shows a front view of a user's right hand 112 in a pronation position selecting the bottom definition for icon 217.

FIG. 4A shows a user's left hand 111 in the home position on the left half 411 of a standard keyboard and a user's right hand 112 in the home position on the right half 412 of a standard keyboard.

FIG. 4B shows the keyboard coming apart to demonstrate which keys are activated by the left hand and therefore mapped to icons on the left side of the display and which keys are activated by the right hand and therefore mapped to icons on the right side of the display.

FIG. 4C shows how the keyboard is flipped and rotated to demonstrate how the keys will be mapped to the icons on the display. This mapping allows the same hand and finger movements used with a standard keyboard to be preserved when used with the invention.

Figure 5:
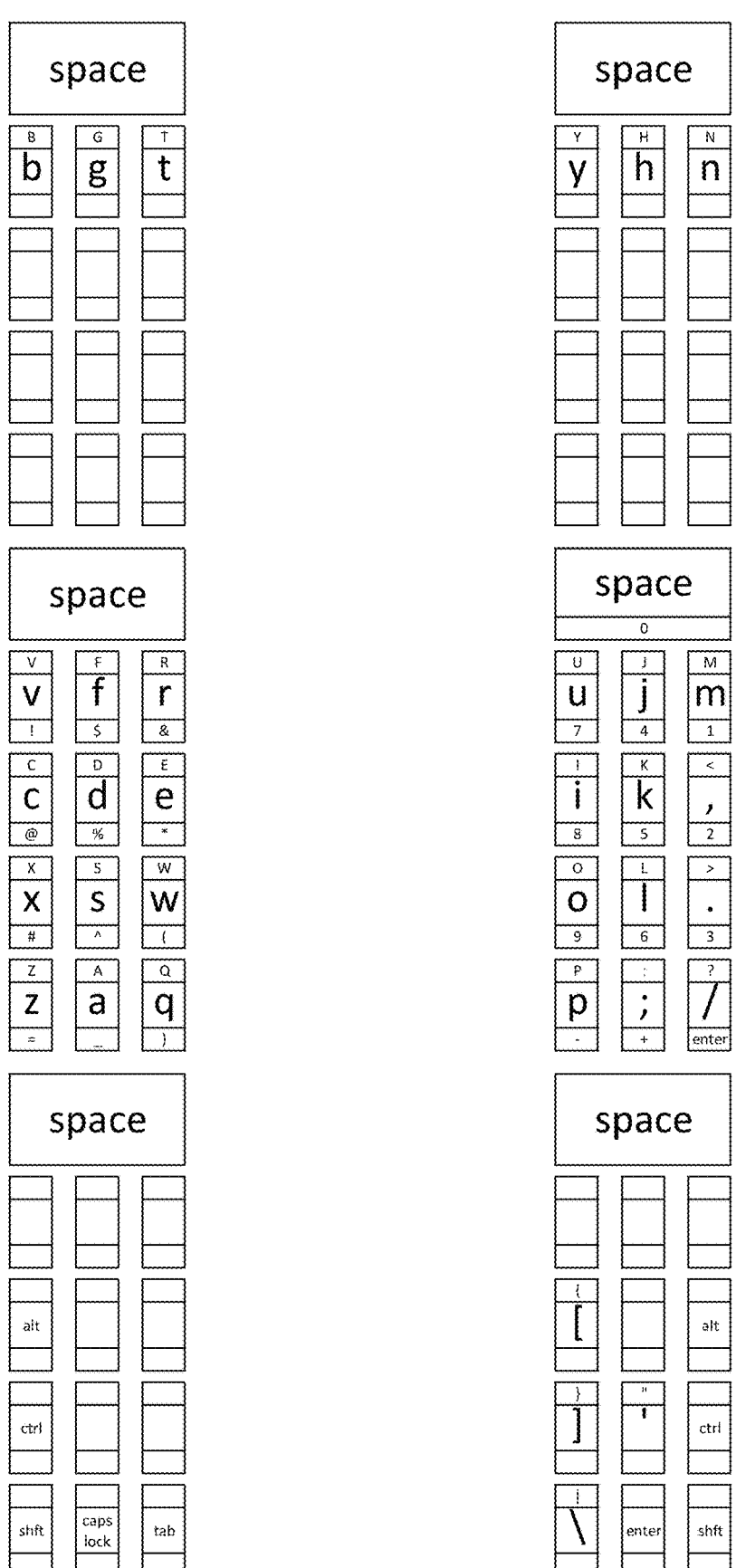
FIG. 5 shows a mapping of the keys on an English language keyboard mapped to a subset of icons.

FIG. 5 shows the resulting map of an English language keyboard to the icons on the display.

Figure 6:
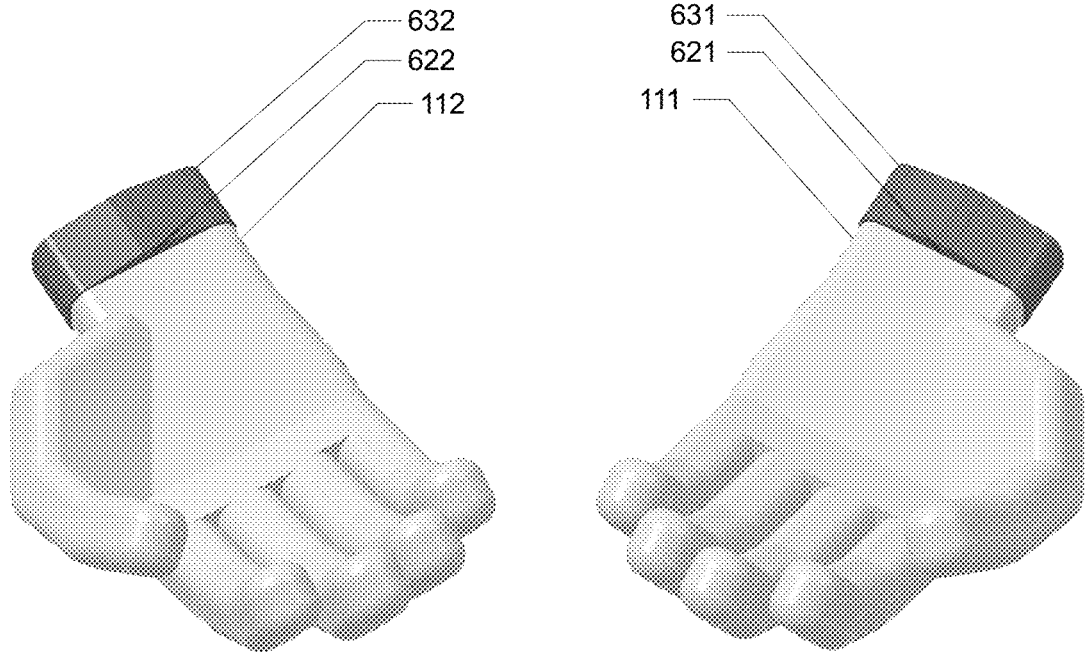
FIG. 6 is an isometric view of a user wearing wrist mounted cameras as the sensing apparatus.

FIG. 6 shows an isometric view of camera 622 mounted on band 632 worn on the wrist of right hand 112 and camera 621 mounted on band 631 worn on the wrist of left hand 111.

I claim:

1. A method for a computer to obtain virtual keyboard input from a user using digit and hand movements comprising:

the user placing his or her hands within a field of view of a camera sending images to an image processor;

the user establishing a home position signaling an intension for keyboard entry by putting hands in a neutral position and flexing and relaxing a select polarity of digits;

the computer displaying a plurality of banks of icons on a paired display wherein each bank contains one or more icons;

arranging the banks of icons into two three-dimensional arrays with a plurality of columns, rows, and pages, wherein one array is displayed on the left side of the display for the left hand and one array is displayed on the right side of the display for the right hand;

the image processor sending position information of each hand and digit relative to the home position to the computer;

the computer highlighting a first bank of icons responsive to the current position of the left hand relative to the home position and highlighting a second bank of icons responsive to the current position of the right hand relative to the home position;

the user flexing one or more digits to select icons among the icons in the currently highlighted banks thereby effecting input to the computer.

2. The method of claim 1 wherein the banks in the center of the left and right arrays are highlighted and the middle page within the icons is highlighted when the hands are in the home position.

3. The method of claim 1 wherein a bank in a row of the array above the center row is highlighted when the corresponding hand is abducted relative to the home position.

4. The method of claim 1 wherein a bank in a row of the array below the center row is highlighted when the corresponding hand is adducted relative to the home position.

5. The method of claim 1 wherein a bank in a column of the array toward the edge of the display is highlighted when the corresponding hand is extended relative to the home position.

5                                                                                6

6. The method of claim 1 wherein a bank in a column of the array toward the center of the display is highlighted when the corresponding hand is flexed relative to the home position.

7. The method of claim 1 wherein the icons change wherein a first alternate page is highlighted when the corresponding hand is supinated relative to the home position.

8. The method of claim 1 wherein the icons change wherein a second alternate page is highlighted when the corresponding hand is pronated relative to the home position.

9. A method for a computer to obtain virtual keyboard input from a user using digit and wrist movements comprising:

a sensing apparatus sending state information of the abduction/adduction, flexion/extension, and pronation/supination of each wrist and the flexion/extension of each digit to the computer;

the user establishing a home position signaling an intension for keyboard entry by putting wrists in a neutral position and flexing and relaxing a select polarity of digits;

the computer displaying a plurality of banks of icons on a paired display wherein each bank contains one or more icons;

arranging the banks of icons into two three-dimensional arrays with a plurality of columns, rows, and pages, wherein one array is displayed on the left side of the display for the left hand and one array is displayed on the right side of the display for the right hand;

the sensing apparatus sending state information of each wrist and digit relative to the home position to the computer;

the computer highlighting a first bank of icons responsive to the current state information of the left wrist relative to the home position and highlighting a second bank of icons responsive to the current state information of the right wrist relative to the home position;

the user flexing one or more digits to select icons among the icons in the currently highlighted banks thereby effecting input to the computer.

10. The method of claim 9 wherein the banks in the center of the left and right arrays are highlighted and the middle page within the icons are highlighted when the wrists are in a neutral state.

11. The method of claim 9 wherein a bank in a row of the array above the center row is highlighted when the corresponding wrist is in an abduction state.

12. The method of claim 9 wherein a bank in a row of the array below the center row is highlighted when the corresponding wrist is in an adduction state.

13. The method of claim 9 wherein a bank in a column of the array toward the edge of the display is highlighted when the corresponding wrist is in an extension state.

14. The method of claim 9 wherein a bank in a column of the array toward the center of the display is highlighted when the corresponding wrist is in a flexion state.

15. The method of claim 9 wherein the icons change wherein a first alternate page is highlighted when the corresponding wrist is in a supination state.

16. The method of claim 9 wherein the icons change wherein a second alternate page is highlighted when the corresponding wrist is in a pronation state.

17. The method of claim 9 wherein the sensing apparatus is a pair of wrist bands with strain sensors to detect the pronation/supination state of the user's wrists, and a camera mounted on the inside of the wrist pointed toward the hand to detect the abduction/adduction and flexion/extension states of the user's wrists and the flexion/extension states of the user's digits.

18. A method for a computer to obtain virtual mouse input from a user using digit and hand movements comprising:

the user placing his or her hands within a field of view of a camera sending images to an image processor;

the user establishing a home position signaling an intension for mouse input by putting hands in a neutral position and flexing and relaxing a select polarity of digits;

the computer displaying two banks of icons on a paired display wherein each bank contains one or more icons wherein one bank of icons is for the left hand and other bank of icons is for the right hand;

the image processor sending position information of each hand and digit relative to the home position to the computer;

the computer moving a pointer on the display responsive to the current positions of the left and right hands relative to the home position;

the user flexing one or more digits to select icons thereby effecting input to the computer.

19. The method of claim 18 wherein the pointer moves up when either hand is abducted relative to the home position.

20. The method of claim 18 wherein the pointer moves down when either hand is adducted relative to the home position.

21. The method of claim 18 wherein the pointer moves left when the left hand is extended relative to the home position or the right hand is flexed relative to the home position.

22. The method of claim 18 wherein the pointer moves right when the right hand is extended relative to the home position or the left hand is flexed relative to the home position.

23. The method of claim 18 wherein the display zooms in when either hand is pronated relative to the home position.

24. The method of claim 18 wherein the display zooms out when either hand is supinated relative to the home position.

25. A method for a computer to obtain virtual mouse input from a user using wrist and hand movements comprising:

a sensing apparatus sending state information of the abduction/adduction, flexion/extension, and pronation/supination of each wrist and the flexion/extension of each digit to the computer;

the user establishing a home position signaling an intension for mouse input by putting wrists in a neutral position and flexing and relaxing a select polarity of digits;

the computer displaying two banks of icons on a paired display wherein each bank contains one or more icons wherein one bank of icons is for the left hand and other bank of icons is for the right hand;

the computer moving a pointer on the display responsive to the current state information of the left and right wrists relative to the home position;

the user flexing one or more digits to select icons thereby effecting input to the computer.

26. The method of claim 25 wherein the pointer moves up when either wrist is in an abduction state.

27. The method of claim 25 wherein the pointer moves down when either wrist is in an adduction state.

28. The method of claim 25 wherein the pointer moves left when the left wrist in the extension state or when the right wrist is in the flexion state.

29. The method of claim 25 wherein the pointer moves right when the right wrist is in the extension state or when the left wrist is in the flexion state.

30. The method of claim 25 wherein the display zooms in when either wrist is in a pronation state.

31. The method of claim 25 wherein the display zooms out when either wrist is in a supination state.

32. The method of claim 25 wherein the sensing apparatus is a pair of wrist bands with strain sensors to detect the pronation/supination state of the user's wrists, and a camera mounted on the inside of the wrist pointed toward the hand to detect the abduction/adduction and flexion/extension states of the user's wrists and the flexion/extension states of the user's digits.

\* \* \* \* \*